(12) United States Patent
Hollis

(10) Patent No.: US 11,829,267 B2
(45) Date of Patent: Nov. 28, 2023

(54) DATA ENCODING USING SPARE CHANNELS IN A MEMORY SYSTEM

(71) Applicant: Lodestar Licensing Group, LLC, Evanston, IL (US)

(72) Inventor: Timothy Mowry Hollis, Meridian, ID (US)

(*) Notice: Subject to any disclaimer, the term of this patent is extended or adjusted under 35 U.S.C. 154(b) by 0 days.

(21) Appl. No.: 17/982,047

(22) Filed: Nov. 7, 2022

(65) Prior Publication Data

US 2023/0126998 A1 Apr. 27, 2023

Related U.S. Application Data

(63) Continuation of application No. 16/915,413, filed on Jun. 29, 2020, now Pat. No. 11,494,277, which is a
(Continued)

(51) Int. Cl.
*G06F 11/20* (2006.01)
*G06F 13/40* (2006.01)
(Continued)

(52) U.S. Cl.
CPC ...... *G06F 11/2005* (2013.01); *G06F 11/1008* (2013.01); *G06F 11/221* (2013.01); *G06F 11/3027* (2013.01); *G06F 11/3041* (2013.01); *G06F 13/4022* (2013.01); *G06F 13/28* (2013.01); *G06F 13/4027* (2013.01); *Y02D 10/00* (2018.01)

(58) Field of Classification Search
None
See application file for complete search history.

(56) References Cited

U.S. PATENT DOCUMENTS 5,517,436 A 5/1996 Andreas et al.
5,930,527 A 7/1999 Shin
(Continued)

OTHER PUBLICATIONS

"Bus-Invert Coding for Low Power I/O", (1999), 1-20.
(Continued)

*Primary Examiner* — Henry Tsai
*Assistant Examiner* — Aurangzeb Hassan
(74) *Attorney, Agent, or Firm* — Fletcher Yoder, P.C.

(57) ABSTRACT

Implementations of encoding techniques are disclosed. The encoding technique, such as a Data bus Inversion (DBI) technique, is implementable in a vertically-stacked memory module, but is not limited thereto. The module can be a plurality of memory integrated circuits which are vertically stacked, and which communicate via a bus formed in one embodiment of channels comprising Through-Wafer Interconnects (TWIs), but again is not limited thereto. One such module includes spare channels that are normally used to reroute a data signal on the bus away from faulty data channels. In one disclosed technique, the status of a spare channel or channels is queried, and if one or more are unused, they can be used to carry a DBI bit, thus allowing at least a portion of the bus to be assessed in accordance with a DBI algorithm. Depending on the location and number of spare channels needed for rerouting, DBI can be apportioned across the bus in various manners. Implementations can also be used with other encoding techniques not comprising DBI.

16 Claims, 17 Drawing Sheets

Related U.S. Application Data continuation of application No. 15/954,149, filed on Apr. 16, 2018, now Pat. No. 10,698,776, which is a continuation of application No. 14/804,027, filed on Jul. 20, 2015, now Pat. No. 9,946,612, which is a continuation of application No. 12/366,379, filed on Feb. 5, 2009, now Pat. No. 9,087,025.

(51) Int. Cl.
*G06F 11/30* (2006.01)
*G06F 11/10* (2006.01)
*G06F 11/22* (2006.01)
*G06F 13/28* (2006.01)

(56) References Cited

U.S. PATENT DOCUMENTS

| | | | |
|---|---|---|---|
| 6,111,833 A * | 8/2000 | Nakagawa | H04L 25/4906 |
| 6,385,739 B1 | 5/2002 | Barton et al. | |
| 6,490,703 B1 | 12/2002 | De la Iglesia et al. | |
| 7,082,489 B2 | 7/2006 | Yeh et al. | |
| 7,154,300 B2 | 12/2006 | Anders et al. | |
| 7,221,292 B2 | 5/2007 | Hein | |
| 7,300,857 B2 | 11/2007 | Akram et al. | |
| 7,400,541 B2 | 7/2008 | Jang et al. | |
| 7,549,011 B2 | 6/2009 | Moschopoulos | |
| 7,739,545 B2 | 6/2010 | Check et al. | |
| 7,795,134 B2 | 9/2010 | Sulfridge | |
| 9,087,025 B2 | 7/2015 | Hollis et al. | |
| 9,946,612 B2 | 4/2018 | Hollis | |
| 10,698,776 B2 | 6/2020 | Hollis | |
| 2004/0136319 A1 | 7/2004 | Becker et al. | |
| 2008/0017306 A1 | 1/2008 | Liu et al. | |
| 2008/0140987 A1 | 6/2008 | Rixner et al. | |
| 2008/0288844 A1 | 11/2008 | Nieuwland | |
| 2009/0019344 A1 | 1/2009 | Yoon et al. | |
| 2009/0057745 A1 | 3/2009 | Yin et al. | |
| 2009/0083453 A1 | 3/2009 | Hsueh et al. | |
| 2009/0193159 A1 | 7/2009 | Li et al. | |
| 2009/0193319 A1 | 7/2009 | Shen et al. | |
| 2009/0294954 A1 | 12/2009 | Bakir et al. | |
| 2009/0313521 A1 | 12/2009 | Hollis | |
| 2010/0088460 A1 | 4/2010 | Jeddeloh | |
| 2010/0118618 A1 | 5/2010 | Kwak | |
| 2010/0199017 A1 | 8/2010 | Hollis | |
| 2015/0324261 A1 | 11/2015 | Hollis | |
| 2018/0232289 A1 | 8/2018 | Hollis | |
| 2020/0364121 A1 | 11/2020 | Hollis | |

OTHER PUBLICATIONS

Ghoneima, et al., "Reducing the Data Switching Activity on Serial Link Buses", IEEE Computer Society, Proceedings of the 7t. International Symposium on Quality Electronic Design, (Jul. 2006), 6 pgs.

Jang, et al., "Spare Line Borrowing Technique for Distributed Memory Cores in SoC", Instrumentation and Measurement Technology Conference, (May 17, 2005), 6 pgs.

Stan, M R, et al., "Coding a Terminated Bus for Low Power", Great Lakes Symp. on VLSI, (Mar. 1995), 70-73.

Stan, Mircea R, et al., "Bus-Invert Coding for Low Power I/O", IEEE Transactions on VLSI Systems, vol. 3, No. 1, (Mar. 1995), 9 pgs.

Unni, Narayanan, et al., "Enhanced Bus Invert Encodings for Low-Power", IEEE, Circuits and Systems, vol. 5, (2002), 25-28.

Youngsoo, Shin, et al., "Reduction of bus transitions with partial bus-invert coding", Electronic Letters, vol. 34, No. 7, (Apr. 2, 1998), 2 pgs.

* cited by examiner

Data without DBI

| 1 2 3 4 5 6 7 8 | Transitions |
|---|---|
| 0 0 0 0 0 0 0 0 | N/A |
| 1 1 1 1 1 1 1 1 | 8 |
| 0 0 0 0 0 0 0 0 | 8 |
| 1 1 1 1 1 1 1 1 | 8 |
| 1 0 1 1 0 1 1 0 | 3 |
| 0 0 1 1 0 0 1 1 | 3 |
| 0 1 0 1 0 0 1 0 | 3 |
| 1 1 0 0 0 1 0 1 | 6 |
| 0 0 1 0 1 0 1 0 | 7 |

Data with DBI

| 1 2 3 4 5 6 7 8 | DBI | Transitions |
|---|---|---|
| 0 0 0 0 0 0 0 0 | 1 | N/A |
| 0 0 0 0 0 0 0 0 | 0 | 1 |
| 0 0 0 0 0 0 0 0 | 1 | 1 |
| 0 0 0 0 0 0 0 0 | 0 | 1 |
| 0 1 0 0 1 0 0 1 | 0 | 3 |
| 1 1 0 0 1 1 0 0 | 0 | 3 |
| 1 0 1 0 1 1 0 1 | 0 | 3 |
| 1 1 0 0 0 1 0 1 | 1 | 4 |
| 1 1 0 1 0 1 0 1 | 0 | 2 |

*Figure 9A*

| Error? | A | | B | | C | | D | |
|---|---|---|---|---|---|---|---|---|
| Y | All but affected D0-D7 | | All but affected X0-X7 | | All but affected X0-X7 | | All but affected X0-X7 | |
| | Carries affected D0-D7 | | Carries affected X0-X7 | | Carries affected X0-X7 | | Carries affected X0-X7 | |
| N | X8-X15 | | X8-X15 | | X8-X15 | | X8-X15 | |
| | DBI1 for X8-X15 | | DBI_T for X0-X15 | | DBI_T for X0-X15 | | unused | |
| N | X16-X23 | | X16-X23 | | X16-X23 | | X16-X23 | |
| | DBI2 for X16-X23 | | DBI2 for X16-X23 | | unused | | unused | |
| N | X24-X31 | | X24-X31 | | X24-X31 | | X24-X31 | |
| | DBI3 for X24-X31 | | DBI3 for X24-X31 | | DBI_B for X16-X31 | | DBI_W for X0-X31 | |

A OR B OR C OR D = H

DATA$_{0-7}$ | SPARE$_0$ | DATA$_{8-15}$ | SPARE$_1$ | DATA$_{16-23}$ | SPARE$_2$ | DATA$_{24-31}$ | SPARE$_3$

| | A | B | C | |
|---|---|---|---|---|
| Error? | Y | | | |
| | All but affected X0-X7 | All but affected X0-X7 | All but affected X0-X7 | |
| | Carries affected X0-X7 | Carries affected X0-X7 | Carries affected X0-X7 | |
| | All but affected X8-X15 | All but affected X8-X15 | All but affected X8-X15 | |
| Error? | Y | | | |
| | Carries affected X8-X15 | Carries affected X8-X15 | Carries affected X8-X15 | |
| | X16-X23 | X16-X23 | X16-X23 | |
| Error? | N | | | |
| | DBI2 for X16-X23 | DBI_T for X0-X15 | unused | |
| | X24-X31 | X24-X31 | X24-X31 | |
| Error? | N | | | III' |
| | DBI3 for X24-X31 | DBI_B for X16-X31 | DBI_W for X0-X31 | |

(OR between B and C, OR between A and B)

| | A | B | C | |
|---|---|---|---|---|
| Error? | Y | | | |
| | All but affected D0-D7 | All but affected X0-X7 | All but affected X0-X7 | |
| | Carries affected D0-D7 | Carries affected X0-X7 | Carries affected X0-X7 | |
| | X8-X15 | X8-X15 | X8-X15 | |
| Error? | N | | | |
| | DBI1 for X8-X15 | DBI_T for X0-X15 | unused | |
| | All but affected D16-D23 | All but affected X16-X23 | All but affected X16-X23 | |
| Error? | Y | | | |
| | Carries affected D16-D23 | Carries affected X16-X23 | Carries affected X16-X23 | |
| | X24-X31 | X24-X31 | X24-X31 | |
| Error? | N | | | III |
| | DBI3 for X24-X31 | DBI_B for X16-X31 | DBI_W for X0-X31 | |

| DATA$_{0-7}$ | SPARE$_0$ | DATA$_{8-15}$ | SPARE$_1$ | DATA$_{16-23}$ | SPARE$_2$ | DATA$_{24-31}$ | SPARE$_3$ |

*Figure 9C*

| | A | | B | | C | |
|---|---|---|---|---|---|---|
| Error? | | | | | | |
| Y | All but affected D0-D7 | Carries affected D0-D7 | All but affected D0-D7 | Carries affected D0-D7 | All but affected X0-X7 | Carries affected X0-X7 |
| Y | All but affected D8-D15 | Carries affected D8-D15 | All but affected D8-D15 | Carries affected D8-D15 | All but affected X8-X15 | Carries affected X8-X15 |
| Y | All but affected D16-D23 | Carries affected D16-D23 | All but affected X16-X23 | Carries affected X16-X23 | All but affected X16-X23 | Carries affected X16-X23 |
| N | X24-X31 | DBI3 for X24-X31 | X24-X31 | DBI_B for X16-X31 | X24-X31 | DBI_W for X0-X31 |

A *OR* B *OR* C = IV

DATA$_{0-7}$ | SPARE$_0$ | DATA$_{8-15}$ | SPARE$_1$ | DATA$_{16-23}$ | SPARE$_2$ | DATA$_{24-31}$ | SPARE$_3$

DATA ENCODING USING SPARE CHANNELS IN A MEMORY SYSTEM

FIELD OF THE INVENTION

Embodiments of this invention relate to, among other things, implementation of data bus inversion in a memory system using Through-Wafer Interconnects (TWIs).

BACKGROUND

An example illustrating data transmission between high-speed components within a single semiconductor device, or between two devices in a communication system, is represented by the system 1 shown in FIG. 1. In FIG. 1, a transmitter 2 (e.g., a microprocessor) sends data over one or more transmission channels 4x (e.g., conductive traces "on-chip" in a semiconductor device or on a printed circuit board) to a receiver 6 (e.g., another microprocessor or memory). As a group, such transmission channels 4x are often referred to as a "data bus," which allows one or more data signals to be transmitted from one device to another.

As discussed in U.S. patent application Ser. No. 11/873,779, filed Oct. 17, 2007, a data bus is susceptible to cross talk, simultaneous switching noise, intersymbol interference, and draws power based on the state of the data and/or frequency of data transition. One way to reduce these adverse effects and to prevent unnecessary power consumption is to encode the data. One specific form of data encoding that can be used is Data Bus Inversion (DBI).

Implementation of DBI includes encoding circuitry at the transmitter which assesses the relationship between data bits to be transmitted across a data bus and then decides (based on a particular DBI algorithm) if it would be advantageous to invert some or all of the data bits prior to transmission. If the data bits are inverted, an additional signal, referred to as a DBI bit, is also set at the encoding circuitry to indicate which data bits are inverted. Typically, as shown in FIG. 1, an extra channel 7 is then needed so that the DBI bit may be transmitted in parallel with the data bits to inform the receiving circuitry which groups of data bits have been inverted. The receiver 6 then uses the DBI bit in conjunction with decoding circuitry to return the incoming group of data bits to its original state.

One specific DBI algorithm, illustrated in FIGS. 2A and 2B, is referred to as the "minimum transitions" algorithm. While there may be variations of this technique, in general the minimum transitions algorithm begins by computing how many bits will transition during an upcoming cycle. When more than a certain number of transitions are predicted, encoding circuitry inverts the entire bus, sets the DBI bit to a specified state (high or low depending on the implementation), and drives the inverted data bits and the DBI bit in parallel across the transmission channels 4x and 7, with the DBI bit used to decode (i.e., de-invert) the inverted data bits prior to use in the receiver 6.

The minimum transitions technique can be implemented using the encoding circuitry of FIG. 2A. Because this technique is discussed at length in the above-mentioned '779 application, it is explained only briefly here. As shown, two successive bytes of data, Din<0.7> (the current byte) and Dout<0:7>(the previous byte), are compared at exclusive OR (XOR) gates 3 on a bit-by-bit basis to determine which bits in the data signals are changing. After this XOR comparison, and in accordance with DBI algorithm 9, the XOR results are summed, and a determination is made as to whether the sum is greater than four (i.e., whether there are

2 at least five transitions from the previous byte of data to the current byte). If the sum is greater than four, the current byte is inverted before it is transmitted, and the DBI bit 7 is transmitted as '1.' Alternatively, if the sum is four or less (i.e., there are no more than four transitions from one byte to the next), the data is transmitted unaltered, and the DBI bit 7 is transmitted as '0.'

FIG. 2B shows how the minimum transitions DBI algorithm 9 works to reduce the number of transitions in a random sequence of bytes, such that no more than four transitions are permitted between successive bytes. Again, this reduction of transitions reduces dynamic current draw at the transmitter 2 and improves the reliability of data transfer by reducing cross talk and simultaneous switching noise.

Different DBI algorithms are beneficial in different circumstances, and not all DBI algorithms are directed to minimizing the number of data transition across transmission channels. For example, other well-known DBI algorithms include the "minimum zeros" algorithm and the "minimum ones" algorithm. The purpose of these algorithms is, respectively, to minimize the number of binary zeros or binary ones transmitted across a channel. Such minimum zeros or ones algorithms conserve power when the driver or receiver circuits coupled to the transmission channels are referenced to VDDQ and VSSQ, respectively, through a resistive termination, and therefore will draw more power when transmitting or receiving a particular data state. For example, if a pull-tip resistor connected to the voltage supply is used in a particular driver circuit, driving a logic '0' will require more power than would driving a logic '1'. As a result, use of a minimum zeros DBI algorithm would be warranted. Likewise, if a pull-down resistor is used, a minimum ones algorithm would be warranted. The minimum transitions and either of the minimum zeros or ones algorithms can also be combined in a DBI algorithm, as is disclosed in U.S. patent application Ser. No. 12/015,311, filed Jan. 16, 2008. In another DBI algorithm, discussed in the above-mentioned Ser. No. 11/873,779, only a portion of the data hits on a bus are inverted to balance the logic states in an encoded byte across the bus, which can he referred to as a Balanced DBI algorithm. Regardless of the DBI algorithm used, all of these DBI algorithms have the common feature of sequentially receiving groups of N original data signals and selectively encoding each group to form a corresponding group of N encoded data signals while issuing at least one encoding (DBI) indicator associated with each group of the N encoded data signals.

A system 100, potentially benefiting from the implementation of DBI is shown in FIGS. 3 and 4, which is disclosed in U.S. patent application Ser. No. 12/136,868, filed Jun. 11, 2008. System 100 comprises a system for reading/writing from/to a memory set 25, which in the illustrated example comprises RAM ICs $16_x$. In such a system, it can be assumed for illustrative purposes that, a microprocessor 10 reads from and writes to the memory set 25, but this is merely one example and any other device or system could be used to so query the memory. In one embodiment, the RAM ICs $16_x$ in the memory set 25 comprise dynamic RAM (DRAM) arrays of memory cells, but could also comprise static RAM (SRAM) cells, or various other types of write/erasable non-volatile memory (e.g., NAND Flash cells, Flash EPROM cells, etc.).

Intervening between the microprocessor 10 and the memory set 25 is a memory controller 12. Memory controllers 12 are well known in the art and work to create a standard interface 20 with which the microprocessor 10 can predictably communicate. The memory controller 12 couples to the microprocessor's data (DQ), address (A), and control (end) busses 11, and converts them to new busses 13 DQ', A', and cntl' suitable for interfacing with a logic integrated circuit (IC) 14, discussed further below. Memory controller 12 typically comprises an integrated circuit separate and independent from other components in the system 100, but this is not strictly necessary, and the controller 12 could be integrated with other components if desired, A high speed differential interface between the controller 12 and the logic chip 14 may exist to improve the overall bandwidth of the system.

In the disclosed embodiment, a logic IC 14 intervenes between the memory controller 12 and the RAM ICs $16_x$. The logic IC 14 contains much if not all of the logic circuitry 49 typically present on a standard RAM IC. For example, the logic IC 14 can contain command decode and queuing circuitry 50. Such circuitry 50 interprets the various command signals on the end' data bus (such as signals write enable (WE), row address strobe (RAS), column address strobe (CAS), and chip select (CS), assuming the RAM arrays $16_x$ comprise DRAM memory), and issues and organizes the commands as appropriate for distribution to the RAM ICs $16_x$ along a control bus end". The logic IC 14 may also contain redundancy circuitry 52 for determining faulty memory addresses in the modified RAM ICs $16_x$ and for rerouting around such defective addresses to functioning memory cells using programmable fuses or antifuses, as is well known. Logic IC 14 may additionally contain error correction circuitry 54, which can comprise well known circuitry for assessing and correcting faulty data in accordance with any number of error correction algorithms. Further, logic IC 14 may contain test mode circuitry 56, which is typically used during manufacturing and/or under the application of special test commands to test the operation of the various RAM ICs $16_x$. Typically, such circuits 50-56 are formed as part of the peripheral logic of a standard memory integrated circuit (not shown), but in the illustrated system such circuitry has been removed from the RAM ICs $16_x$.

System 100 can be manufactured as shown in FIG. 4, which shows the logic IC 14 and the RAM ICs $16_x$ integrated in a multichip module 40 such that they are vertically stacked within a singular package. The bus 15 between the logic IC 14 and the RAM ICs $16_x$ is formed using Through-Wafer Interconnects (TWIs) 83. (If the integrated circuits at issue are silicon-based, these may also be known as Through-Silicon Vias (TSVs)). As is known, TWIs 83 run though at least a portion of the logic IC 14 and through at least a portion of the modified RAM ICs $16_x$. The TWIs 83 comprising the bus 15 are connected in series using solder bumps 84. The module 40 can likewise be affixed to the printed circuit board using solder bumps 82.

Logic IC 14 may also contain additional integration circuitry relevant to the modular integration of the RAM ICs $16_x$. For example, TWI rerouting circuitry 58 (FIG. 3) can assess the operation of the various TWIs 83 comprising bus 15, and if necessary can reroute around any connections deemed to be faulty. To facilitate such rerouting, and as shown in FIG. 4, some of the TWIs 83 can comprise spare TWIs 85 which are used in the event that an otherwise prescribed TWI 83 is, or has become, faulty. In this case, switching circuitry on both the logic IC 14 and the RAM ICs $16_x$ (not shown) are used to affect the rerouting under the control of signals from the TWI rerouting circuitry 58 as is discussed in further detail later. Circuitry and techniques for rerouting of signals on a TWI-based bus are disclosed in U.S. patent application Ser. No. 12/166,814, filed Jul. 2, 2008; Ser. No. 12/173,722, filed Jul. 15, 2008; Ser. No. 12/242,325, filed Sep. 30, 2008; and Ser. No. 11/873,118, filed Oct. 16, 2007.

As recognized in the above-mentioned '868 application, DBI can be used with the TWI-based bus 15. However, although the use of DBI can reduce power draw in a system such as system 100, it is generally not desirable to have to provide additional signaling on the bus to provide the DBI channels, such as channel from FIG. 1. In a system like that depicted in FIG. 4, the TWI-based bus 15 is already quite complicated, and can comprise hundreds to thousands of TWIs 83. To add additional TWIs 83 to carry the DBI signals takes up space and adds complication to the design and manufacture of the module 40.

Nevertheless, the inventor believes that advances in system integration as exemplified by system 100 are making the implementation of DBI, and other data encoding algorithms, more attractive. At the same time, the use of such algorithms is becoming more important as systems shrink and as it becomes increasingly important that such systems reduce their power consumption and operate at high speeds. The inventor believes that it would be desirable to include DBI in a system such as system 100, without adding additional TWI-based channels to carry the DBI signals.

BRIEF DESCRIPTION OF THE DRAWINGS

FIGS. 9A-9E illustrate different manners in which the bus of FIG. 8 can be treated by the DBI control circuitry to implement DBI in different portions of the bus.

DETAILED DESCRIPTION

Implementations of encoding techniques are disclosed. The encoding technique, such as a Data bus inversion (DBI) technique, is implementable in a vertically stacked memory module, but is not limited thereto. The module can be a plurality of memory integrated circuits which are vertically stacked, and which communicate via a bus formed in one embodiment of channels comprising Through-Wafer Interconnects (TWIs), but again is not limited thereto. One such module includes spare channels that are normally used to reroute a data signal on the bus away from faulty data channels. In one disclosed technique, the status of a spare channel or channels is queried, and if one or more are unused, they can be used to carry a DBI bit, thus allowing at least a portion of the bus to be assessed in accordance with a DBI algorithm. Depending on the location and number of spare channels needed for rerouting, DBI can be apportioned across the bus in various manners. Implementations can also be used with other encoding techniques not comprising DBI.

Figure 1:
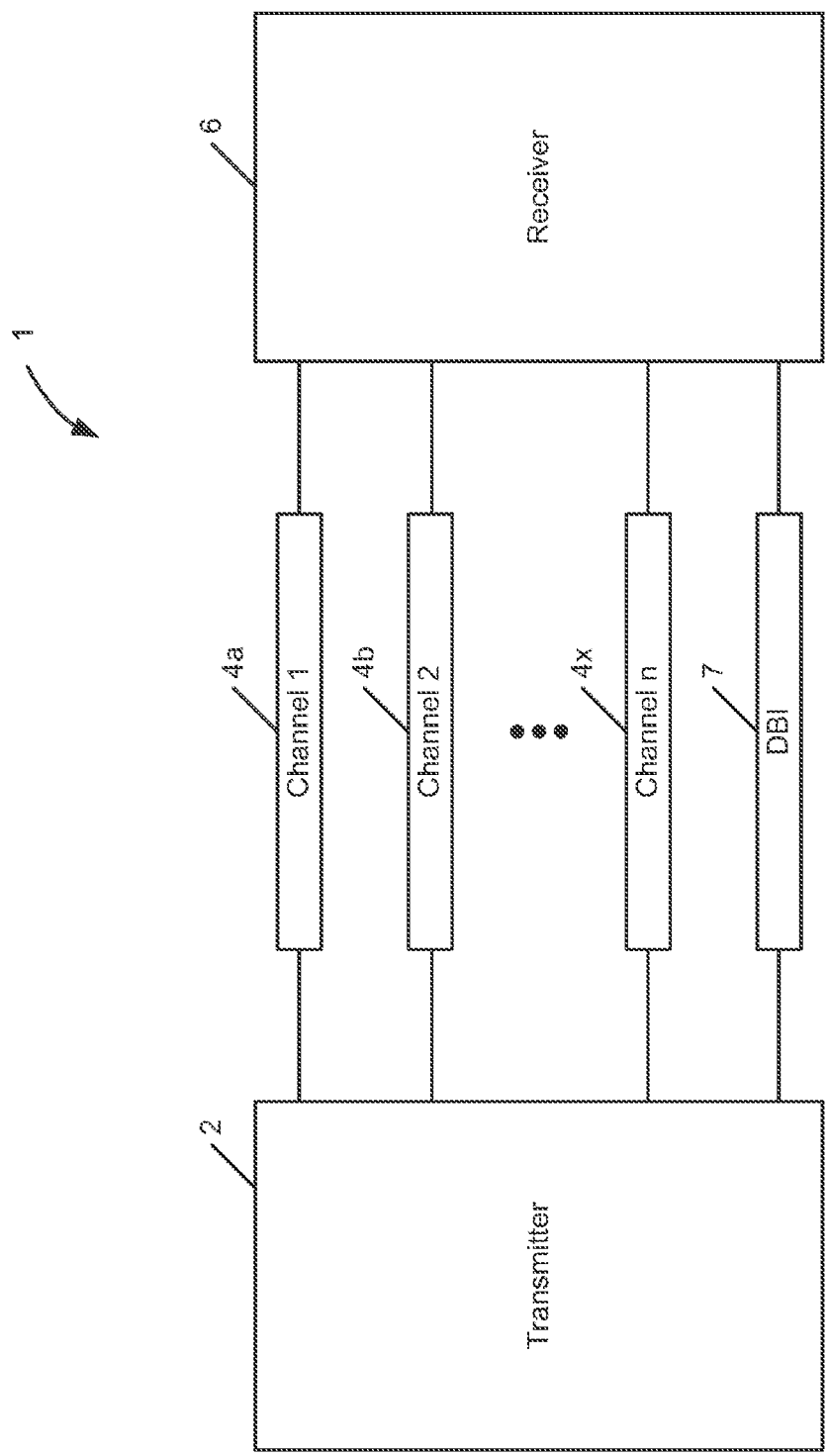
FIG. 1 illustrates a block diagram of a data transmission system.
Figures 2A, 2B:
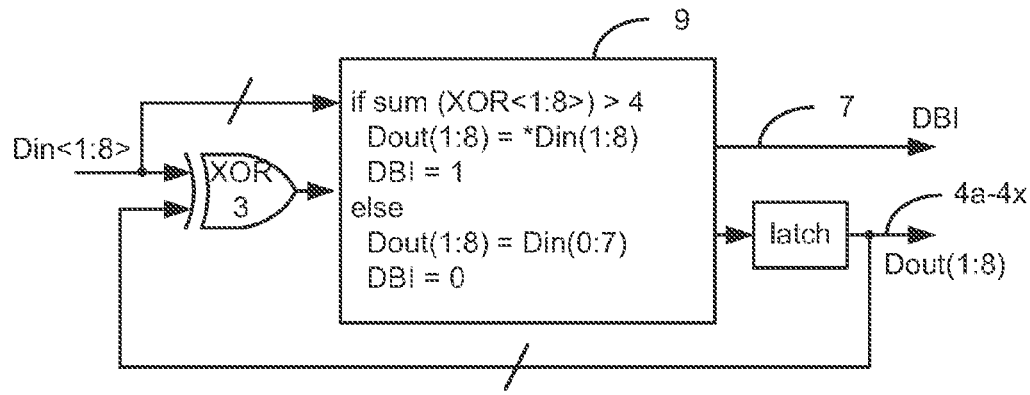
FIGS. 2A and 2B illustrates a block diagram and a data table illustrating a minimum transitions data bus inversion (DBI) technique.
Figure 3:
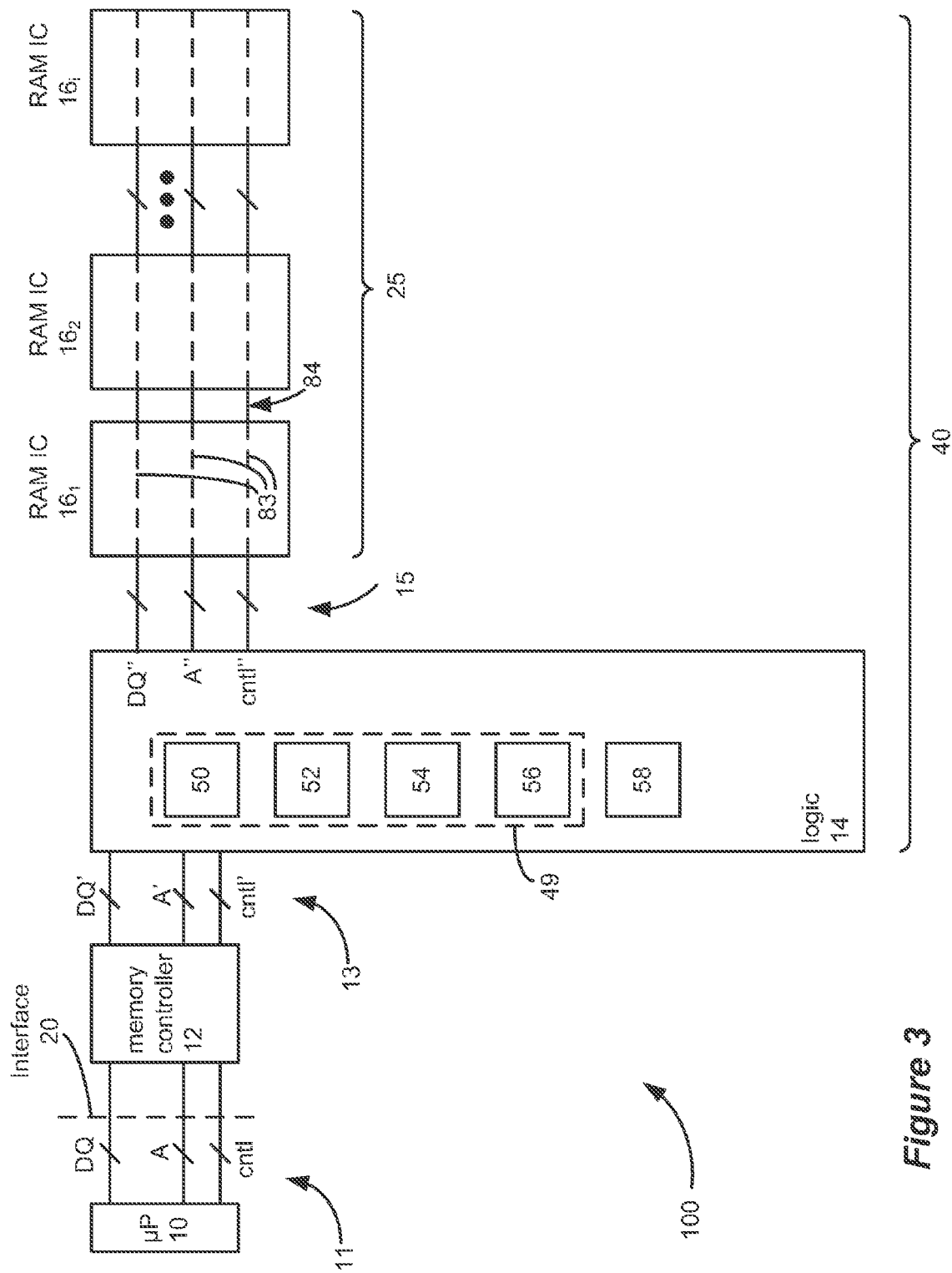
FIG. 3 illustrates a system in which RAM ICs are used in conjunction with a logic integrated circuit having circuitry implementing functions traditionally present on RAM ICs.
Figure 4:
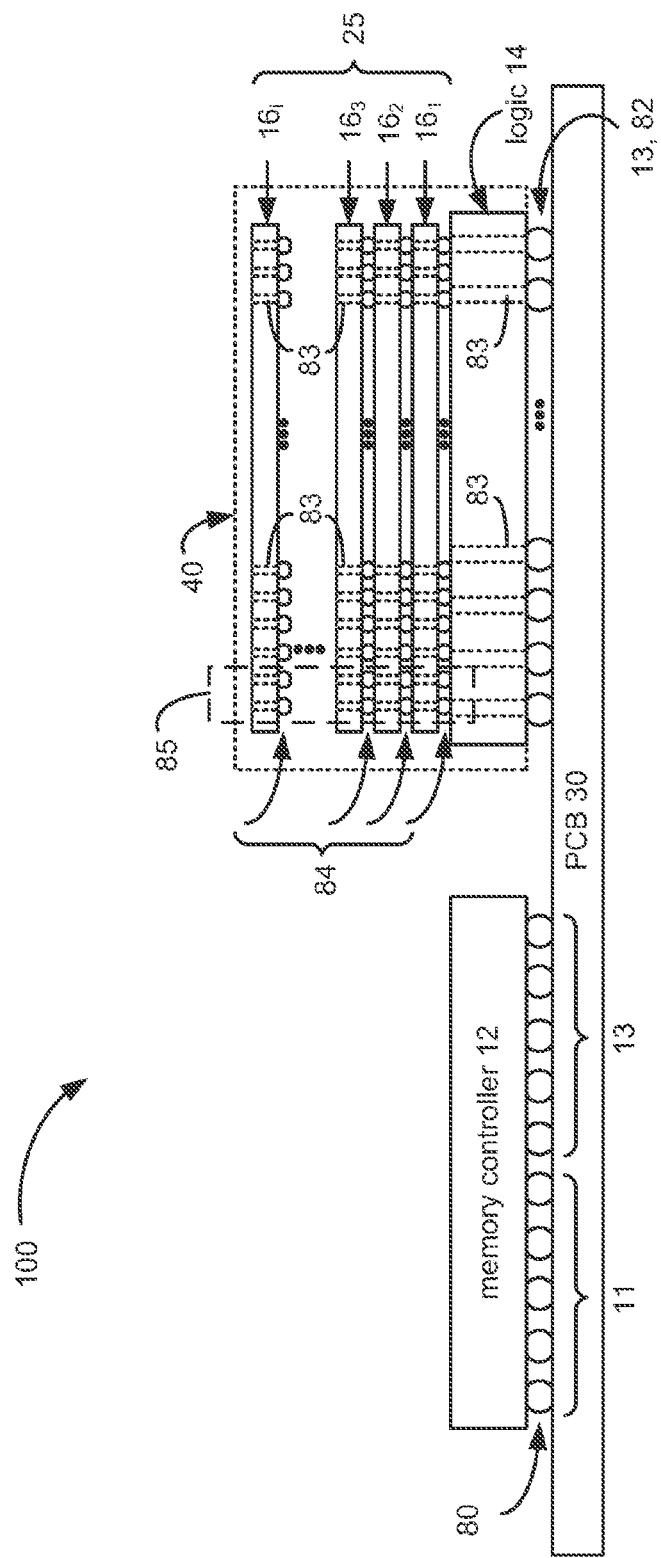
FIG. 4 illustrates how the system of FIG. 3 can be implemented using a vertically-stacked memory module on a printed circuit board.
Figure 5:
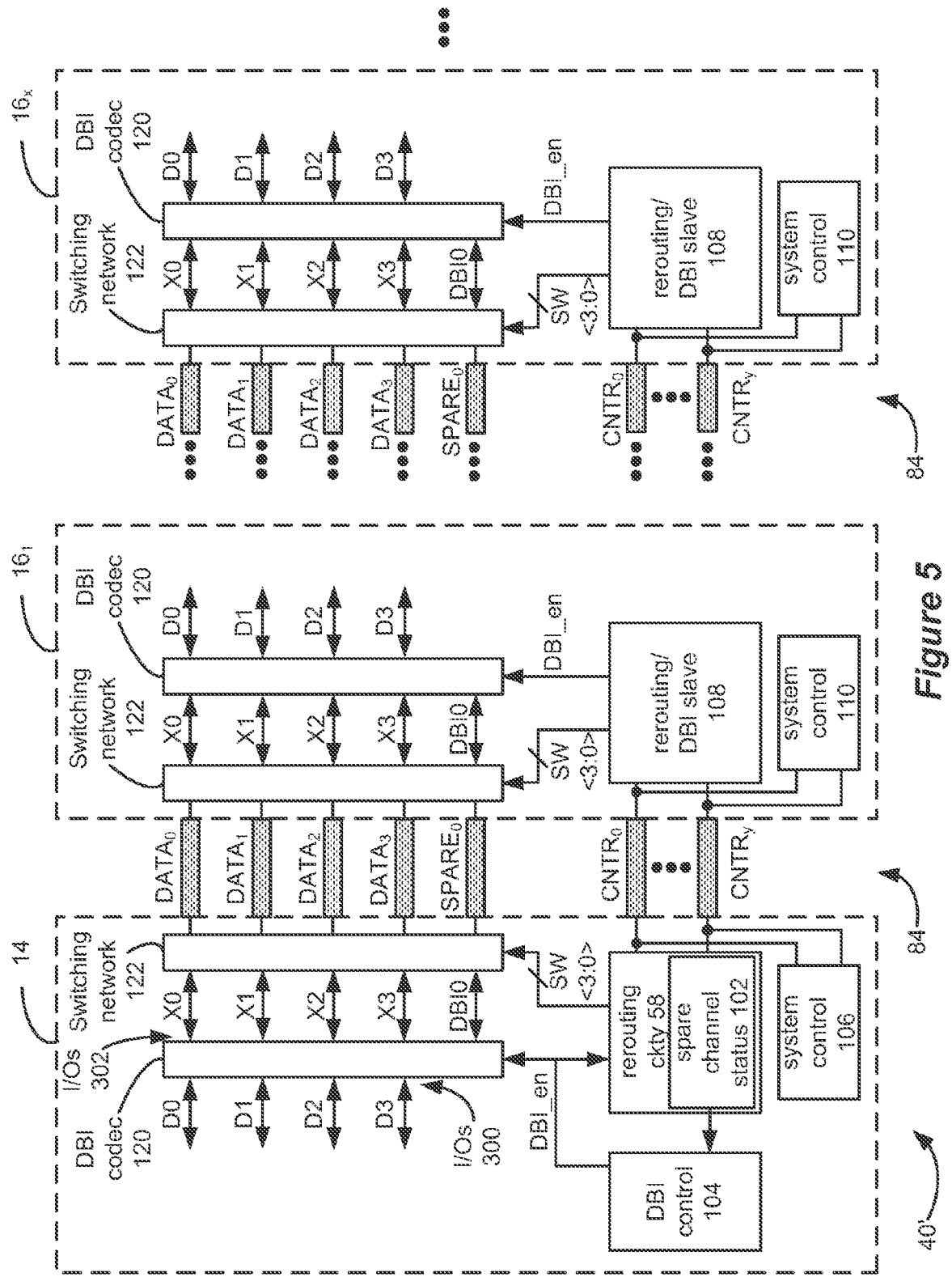
FIG. 5 illustrates, in accordance with an embodiment of the invention, improved logic circuitry implementable in the system of FIGS. 3-4 for assessing the status of a spare channel to assist in the application of DBI.

FIG. 5 shows a general schematic for an improved vertically-stacked memory module 40' generally constructed similarly to the module 40 shown in FIG. 4. As before, the improved module includes a logic IC 14 and a plurality of RAM ICs 16$_x$. A parallel bus, akin to bus 15 in FIGS. 3 and 4, carries a plurality of data channels in parallel between the logic IC 14 and the RAM ICs 16$_x$. Only four data. channels (DATA$_0$-DATA$_3$) are shown for simplicity. These data channels can carry data, addressing, or control signals, but are assumed to carry the data that is read from or written to the RAM IC16$_x$ for simplicity. Given the vertically-stacked nature of the module 40', the data channels are implemented using TWIs 83 and solder bumps 84, as was depicted in FIG. 4. However, the TWIs 83 are not shown in FIG. 5 for simplicity. As before, the data channels are bidirectional to allow reading and writing from and to the RAM ICs 16$_x$.

The data channels DATA$_i$ transfer original data signals Di between the logic IC 14 and the RAM ICs 16$_x$. Generally speaking, and ignoring the distinction between original data signals Di and encoded data signals Xi for the moment, each data signal Di is designated for connection to a particular data channel DATA$_i$, although this correspondence can vary if rerouting is necessary as explained further below. Absent such rerouting, and assuming a write to the RAM ICs 16$_x$ is occurring, output data path circuitry in the logic IC 14 produces original data signals D0-D3 in parallel, which are then ultimately transferred to data channels DATA$_0$-DATA$_3$ respectively, and ultimately to the D0-D3 input data path circuitry in the RAM ICs 16$_x$. A reading operation occurs similarly, but in the opposite direction.

Also illustrated in FIG. 5 is a spare channel, SPARE$_0$. SPARE$_0$ provides an alternative path for a data signal if its designated data channel is (or should become) faulty, for example, because a TWI in that data channel has poor connectivity. Like the data channels, the spare channels can comprise TWIs. Rerouting of the data signals occurs in. conjunction with switching networks 122. Jumping ahead to FIG. 6A for a moment, notice via the dotted lines that the switching network 122 operating in the logic IC 14 and each of the RAM ICs 16$_x$ have rerouted a particular data signal D1 away from a faulty data channel (DATA$_1$) to the spare channel (SPARE$_0$). Such rerouting occurs under the control of rerouting circuitry 58 operable in the logic IC 14, and rerouting/DBI slave circuitry 108 operable in the RAM ICs 16$_x$, whose functionality will be explained later.

Returning to FIG. 5, note also the provision of a plurality of control channels (CNTR$_0$-CNTR$_Y$). The control channels allow for various control signals to be sent back and forth between the logic IC 14 and the RAM ICs 16$_x$. Such control signals could comprise the memory-specific control signals discussed earlier (i.e., WE, RAS, CAS, CS, or indicators thereof) or other control signals useful for generally controlling the operation of the module 40'. The nature of the control signals sent on the control channels can generally be dictated by system control circuit blocks 106 and 110 operating in the logic IC 14 and the RAM ICs 16$_x$ respectively. Because general control signals not involved with rerouting are not of particular interest to this disclosure, the details of system control circuit blocks 106 and 110 are omitted.

The control channels CNTR$_0$-CNTR$_Y$ may be time multiplexed such that they carry different control signals at different points in time. For example, the control channels may can signals relevant to rerouting only upon initialization of the module 40', or when it is otherwise warranted to make a continuity check of the TWI-based bus of data channels, which is discussed further below. The control channels CNTR$_0$-CNTR$_Y$ may then carry memory-specific control signals (e.g., from system control circuit blocks 106 or 110) during periods of normal operation, for example.

As just noted, the control channels CNTR$_0$-CNTR$_Y$ may carry control signals relevant to rerouting around faulty data channels. Such control signals are generated at rerouting circuitry 58 in the logic IC 14, which generally functions during periods of initialization or testing to check for faulty data signals and to perform rerouting to an appropriate spare channel such as SPARE$_0$. (The above-referenced patent applications discuss such operations further). In the example shown, rerouting circuitry 58 generates four switch control signals SW<3:0>, which are sent to the switching network 122 in the logic IC 14. As will be shown in further detail later, the switching network 122 then reroutes the data signal originally assigned to the faulty data channel onto the spare channel. Indication of these switch control signals SW<3:0> are also sent via the control channels CNTR$_0$-CNTR$_Y$ to the rerouting/DBI slave circuitry 108 in the RAM ICs 16$_x$, where they are stored and used to generate matching control signals SW<3:0> to control matching switching networks 122 in the RAM ICs 16$_x$. The switch control signals can be transported across the control channels CNTR$_0$-CNTR$_Y$ along one channel, many channels, in serial or parallel, in an encoded fashion, or in any appropriate fashion.

Figure 6A:
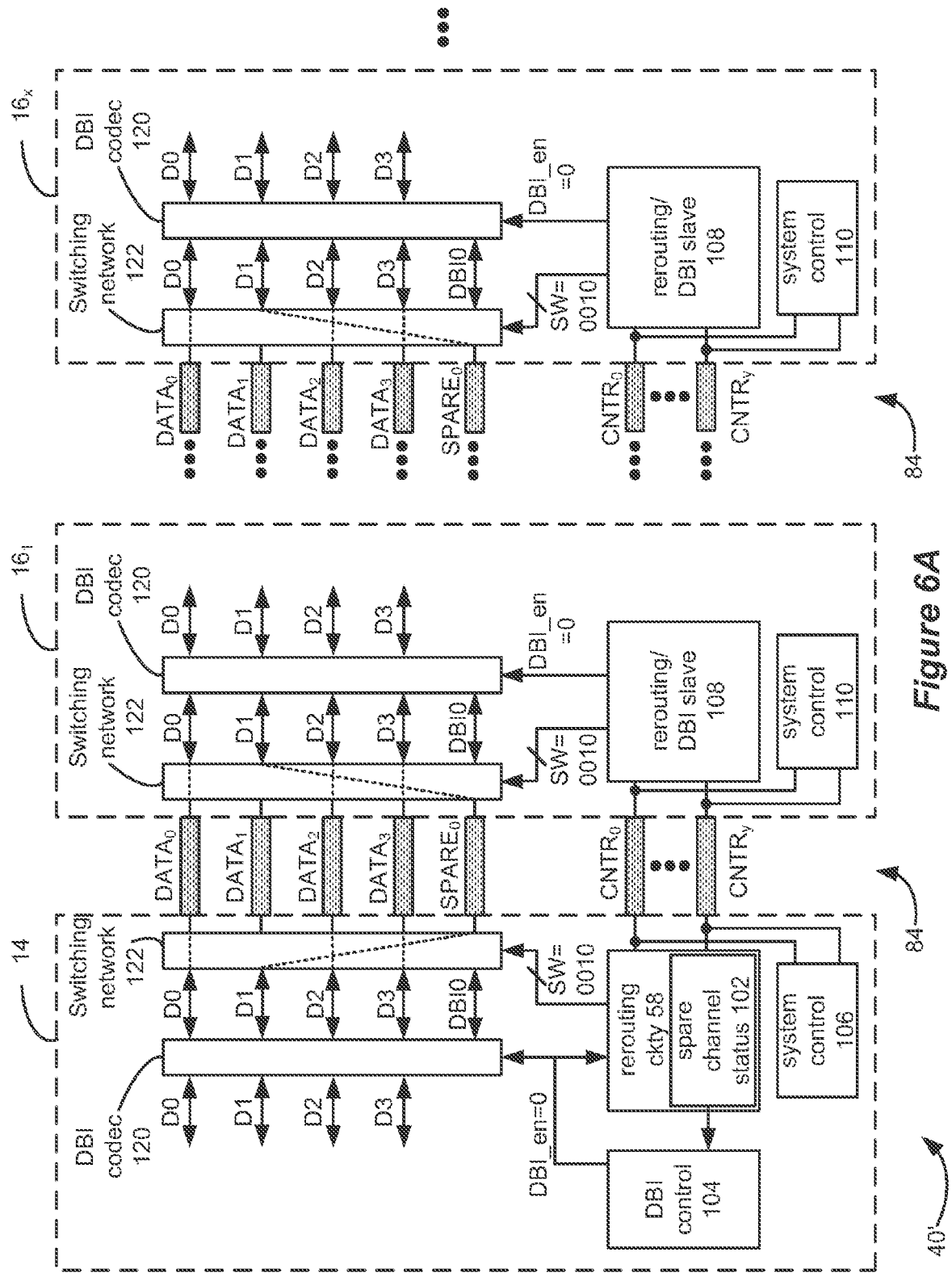
FIG. 6A illustrates how a data signal designated for a faulty data channel is rerouted to a spare channel using a switching matrix.

FIG. 6A shows the operation of the switch control signals. In the example shown, rerouting circuitry 58 has determined that data channel DATA$_1$ is faulty. This causes switch control signal SW<1> in the illustrated example to go high. When this occurs, original data signal D1 is routed to the spare channel SPARE$_0$ instead to its normally designated DATA1 signal, as shown by the dotted lines. Switching network circuitry 122 for accomplishing this result is shown in FIG. 6C. Continuing to ignoring the distinction between data signals Xi and Di for the moment, it is seen that the switch control signals SW<3:0> are sent to the control input of multiplexers 123. If a particular data signal Di does not have its corresponding switch control signal asserted (i.e, if SW<i>=0), then that data signal passes to DATA$_i$. If a particular data signal (e.g., D1) does have its corresponding switch control signal asserted (e.g., if SW<1>=1), then that data signal passes to the spare channel, SPARE$_0$. This same routing occurs for data traveling in the opposite direction.

Figure 7A:
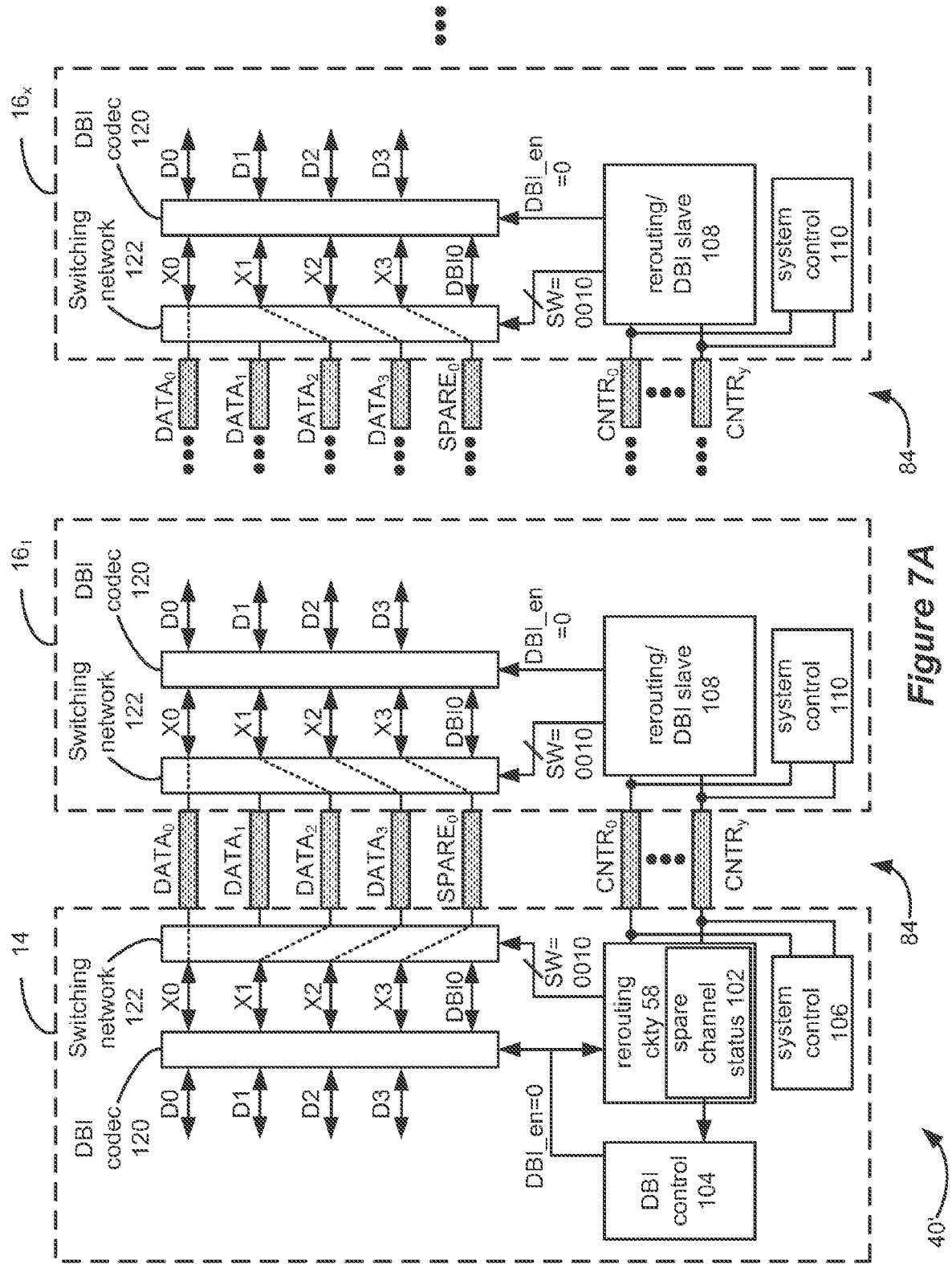
FIGS. 7A and 7B illustrate an alternative switching network useable to reroute to a spare channel (i) a data signal away from a faulty data channel or (ii) a DBI bit in the event that no data channel is faulty.
Figure 7B:
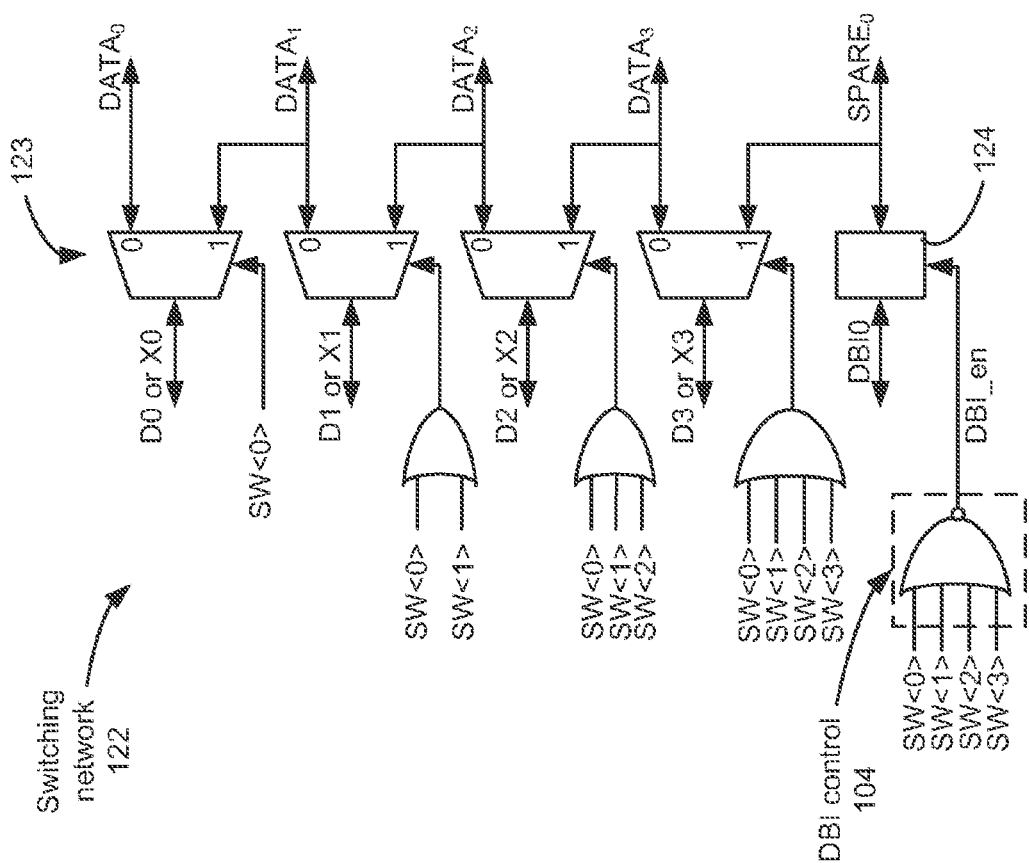

FIGS. 7A and 7B shows alternative switching network circuitry 122. In this embodiment, a faulty data channel is bypassed by sending the affected data signal (e.g., D1) and all subsequent data signals to the next available data channel and to the spare data channel. Thus, as shown by the dotted lines in FIG. 7A, data signal D1 is sent to $DATA_2$, D2 is sent to $DATA_3$, and D3 is sent to $SPARE_0$. Offsetting the affected and subsequent data signals by one channel can be accomplished by using OR logic gates to process the switch control signals SW<3:0>, as shown in FIG. 7B. The operation of such logic gates should be self explanatory to one skilled in the art and is thus not further elaborated upon here.

Figure 6B:
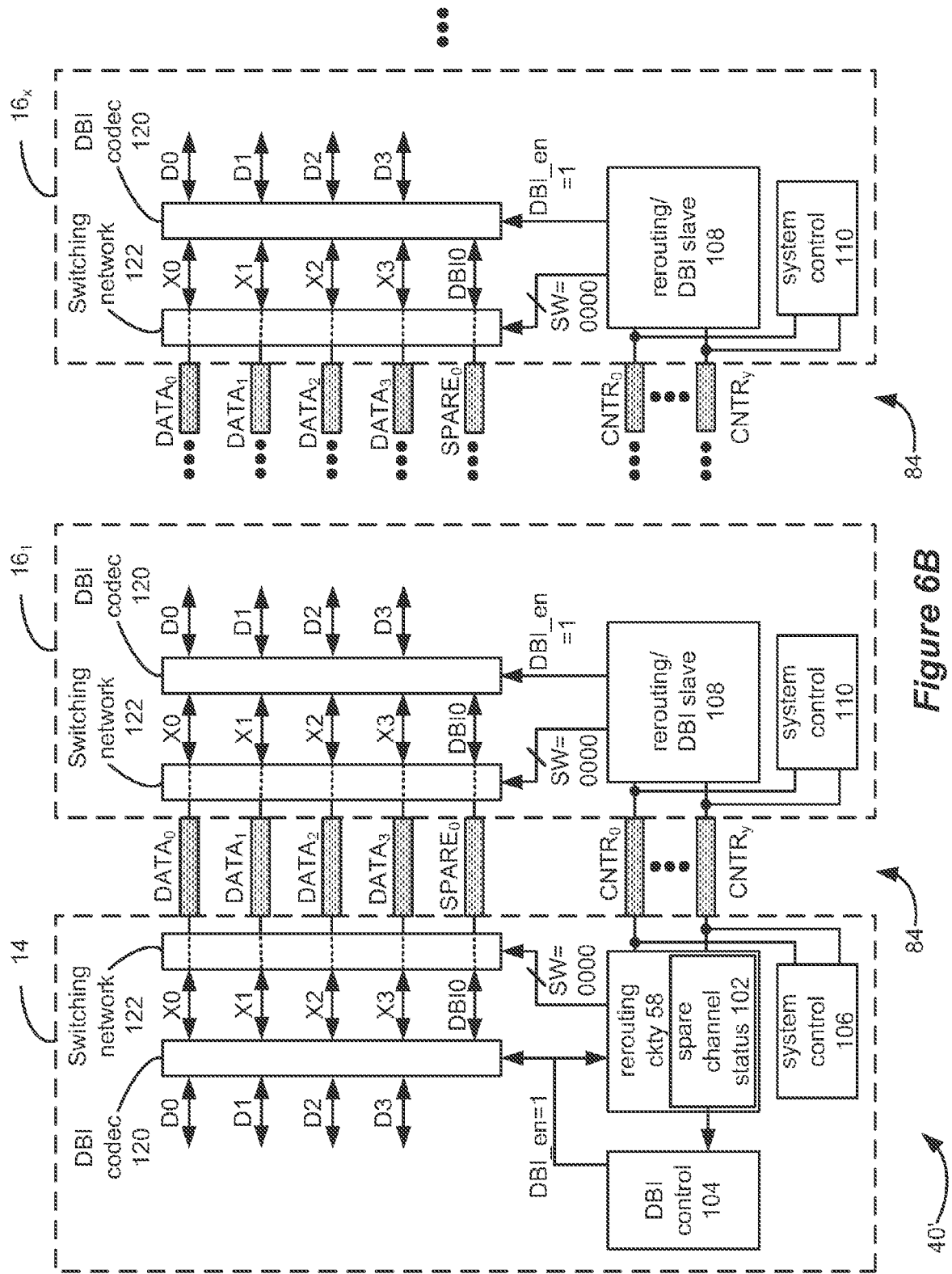
FIG. 6B illustrates that if the spare channel of FIG. 6A is not used for rerouting, that channel may be used to carry a DBI bit.
Figure 6C:
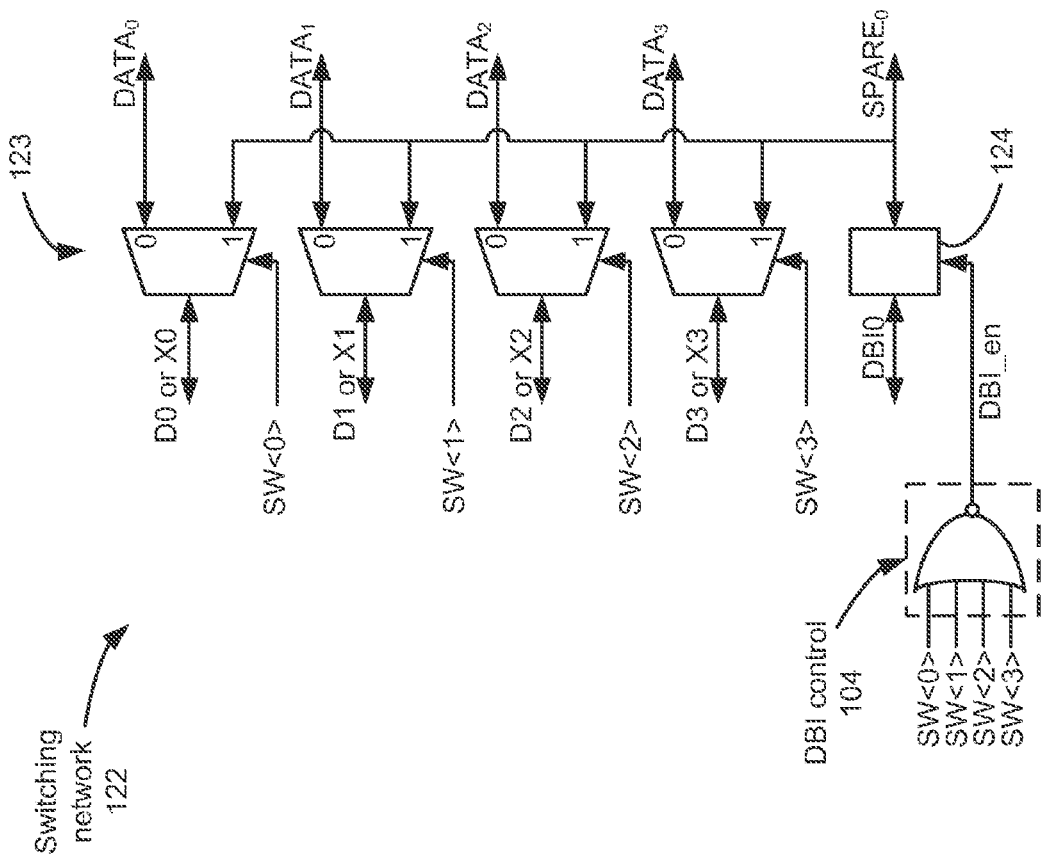
FIG. 6C illustrates the switching network useable to reroute to a spare channel (i) a data signal away from a faulty data channel or (ii) a DBI bit in the event that no data channel is faulty.

In the event that the spare channel, $SPARE_0$, is not used for rerouting, it may be used for DBI in accordance with embodiments of the disclosed technique, as shown in FIG. 6B. As illustrated, the logic IC 14 and each of the RAM ICs $16_x$ contains a DBI codec 120 for producing encoded data signals Xi from the original data signals Di, and for decoding the encoded data signals Xi back into the original data signals Di. First Input/Outputs (I/Os) 300 couple to the original data signals, while second I/Os 302 couple to the encoded data signals and to the DBI bit (see FIG. 5). So configured, the DBI codec 120 when enabled either encodes the original data signals at the first I/Os 300 into encoded data signals at the second I/Os 302 and issues a corresponding DBI bit at the DBI I/O 302, or decodes encoded data signals at the second I/Os 302 into original data signals at the first I/Os 300 in conjunction with a DBI hit received at the DBI I/O 302. The DBI codec 120 can run any number of DBI algorithms as was discussed in the Background of this disclosure, and no particular DBI algorithm is important to the disclosed technique. DBI encoding and decoding circuitry is well known, and an example can be found in the above-mentioned '779 application.

Regardless of the DBI algorithm employed in DBI codec 120, the algorithm assesses the original data signals D0-D3 and decides whether to invert all or part of those signals. If the DBI algorithm's assessment reveals a benefit to inverting all or a portion of the original data signals D0-D3, then all or a portion of those data signals are inverted to produce encoded data signals X0-X3, and a DBI bit, DBI0, is issued. If the algorithm decides that there is no benefit to inversion, then the original data signals D0-D3 are simply passed as signals X0-X3 without inversion, and the DBI bit is not asserted for that data set.

Whether DBI can be enabled is determined by DBI control circuitry 104. DBI control circuitry 104 essentially determines whether the spare channel, $SPARE_0$, is being used because it is needed for rerouting. If $SPARE_0$ is not being used, DBI control circuitry 104 will enable the DBI codec 120 to apply the DBI algorithm to the original data signals D0-D3 to produce encoded data signals X0-X3 which are forwarded to data channels $DATA_0$-$DATA_3$, and to provide the DBI bit to $SPARE_0$. If $SPARE_0$ is being used because it is necessary to reroute one of the data signals away from a faulty data channel, DBI control circuitry 104 disables the DBI codec 120 such that the original data signals D0-D3 merely flow through the DBI codec without analysis and without generation of the DBI bit. The switching network 122 then reroutes the data signal affected by the reroute to $SPARE_0$, and the other data signals pass to their respective data channels $DATA_0$-$DATA_3$ as discussed previously.

To do this, the DBI control circuitry 104 receives an indication of the spare channel status from the rerouting circuitry 58 in the logic IC 14. Specifically, the rerouting circuitry 58 contains spare channel status circuitry 102, which comprises a means for storing an indication of the status of the spare channel. In one simple embodiment, spare channel status circuitry 102 can comprise a four-bit storage register for the switch control signals SW<3:0>, which values are then sent to the DBI control circuitry 104. The DBI control circuitry 104 then analyzes the switch control signals SW<3:0> to determine whether the spare channel is being used for rerouting or not, and whether the DBI codec 120 can be enabled.

One simple implementation of the DBI control circuitry 104 is shown in FIGS. 6C and 7B, and comprises a NOR gate. Should any of the switch control signals SW<3:0> be asserted (e.g., SW<1>=1), indicating a faulty data channel and hence the need for rerouting to the spare channel, the NOR gate outputs a 0 as the DBI enable signal (DBI_en), which disables the DBI codec 120 from applying its algorithm to the data signals D, hence, the original data signals D0-D3 flow through the DBI codec 120 unaffected. Additionally, disabling the DBI enable signal disables pass gate 124, which prevents the DBI bit, DBI0, from passing from the DBI codec 120 to the spare channel. At the same time, the assertion of one of the switch control signal (e.g., SW<1>) causes the affected data signal (i.e., D1) to be rerouted away from its designate data channel (i.e., $DATA_1$), either by routing that data signal to the spare channel, $SPARE_0$ (FIG. 6C), or by shifting the affected and subsequent data signals (FIG. 7B), as discussed previously. Such rerouting is shown in dotted lines in FIGS. 6A and 7A.

Should none of the switch control signals be asserted (i.e., SW<3:0>=0), meaning that rerouting of data is not necessary, then the NOR gate of DBI control circuitry 104 outputs a 1 as the DBI enable signal, DBI_en. This enables the DBI codec 120 to apply its algorithm to the original data signals D0-D3, to produce encoded data signals X0-X3, and to generate a corresponding DBI bit, DBI0. Additionally, enabling the DBI enable signal enables pass gate 124, which allows the DBI bit, DBI0, to pass to the otherwise unused spare channel, $SPARE_0$. At the same time, the failure to assert any of the switch control signals SW<3:0> causes the switching network 122 to pass the encoded data bits X0-X3 to their respective data channels $DATA_0$-$DATA_3$. Such routing is shown in dotted lines in FIG. 6B.

In the technique as described thus far, the logic IC 14, via operation of rerouting circuitry 58 and DBI control 104, comprises the master controllers for rerouting and DBI enablement. The RAM ICs $16_x$, by contrast, contain mere corresponding slave controllers, i.e., rerouting/DBI slave circuitry 108. As mentioned earlier, the rerouting/DBI slave circuitry 108 can receive and store rerouting signals from the rerouting circuitry 58 in the logic IC 14 via control channel(s) $CNTR_0$-$CNTR_y$. The DBI enable signal, DBI_en, can also be transmitted to the RAM ICs $16_x$ by the control channel(s) $CNTR_0$-$CNTR_y$, but it may be more convenient instead to merely generate the DBI enable signal at the RAM ICs $16_x$ from the switch control signals stored at the slave circuitry 108. To summarize, rerouting DBI slave circuitry 108 essentially mimics the operation of the rerouting circuitry 58 and DBI control circuitry 104 operable in the logic IC 14 so that the DBI codecs 120 and the switching networks 122 in both the logic IC 14 and the RAM ICs $16_x$ can be controlled similarly.

Figure 8:
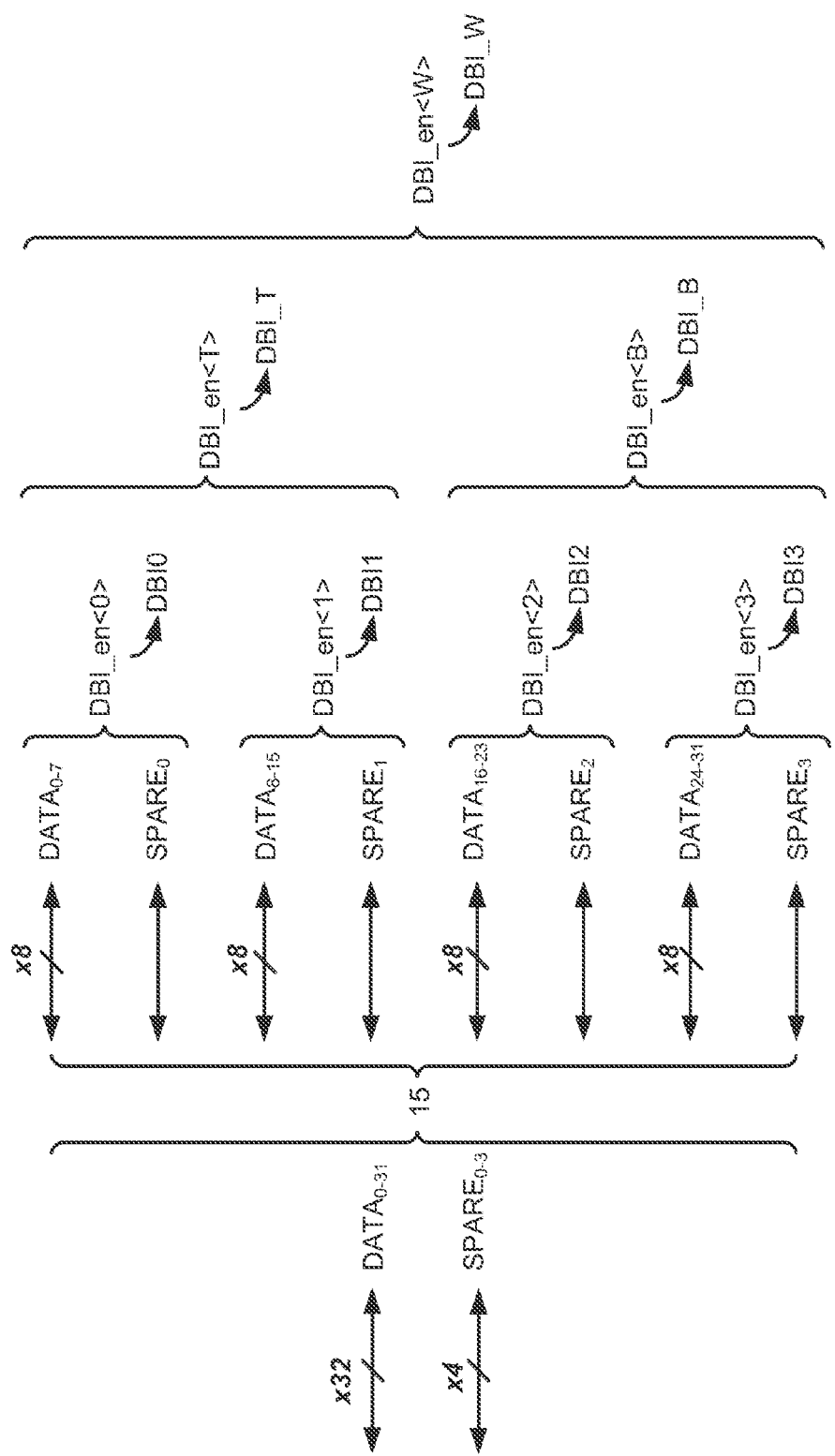
FIG. 8 illustrates application of the disclosed technique in the context of a larger bus having a plurality of spare channels, and specifically notes the DBI enable signals that the system may need to consider to apportion the bus from a DBI standpoint.
Figure 9A:
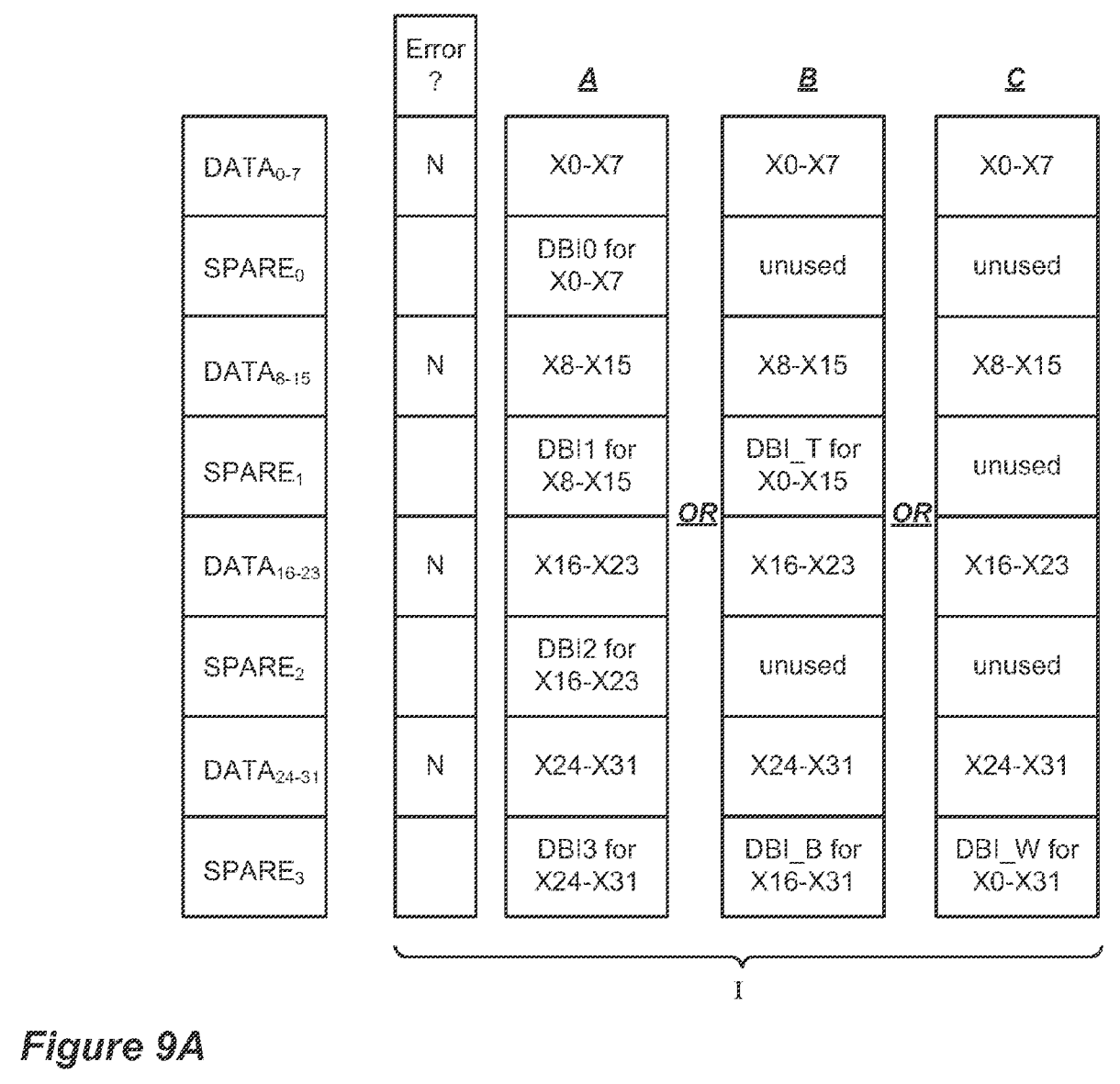
Figure 9E:
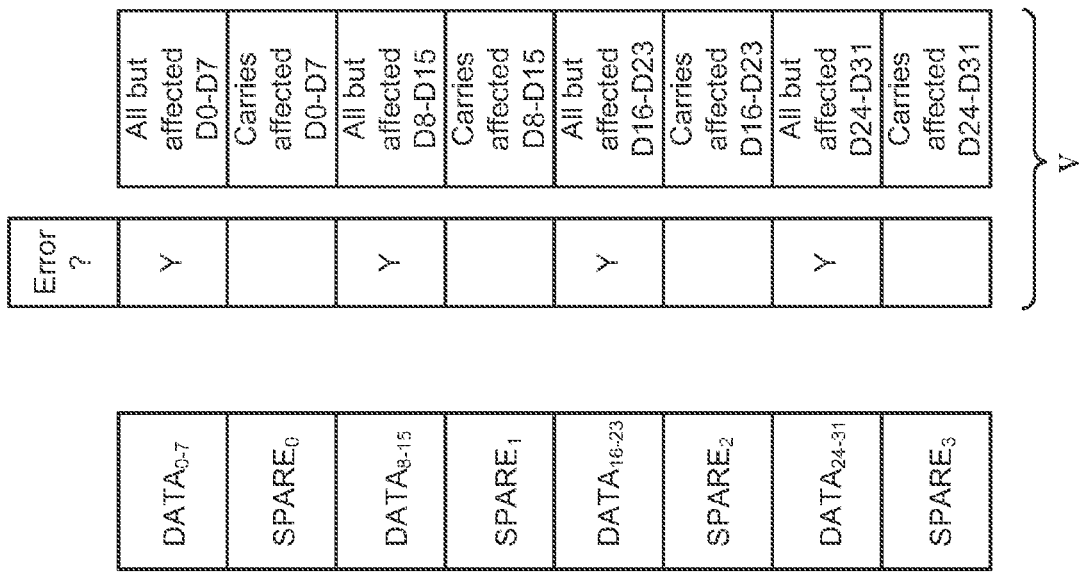
Figure 10:
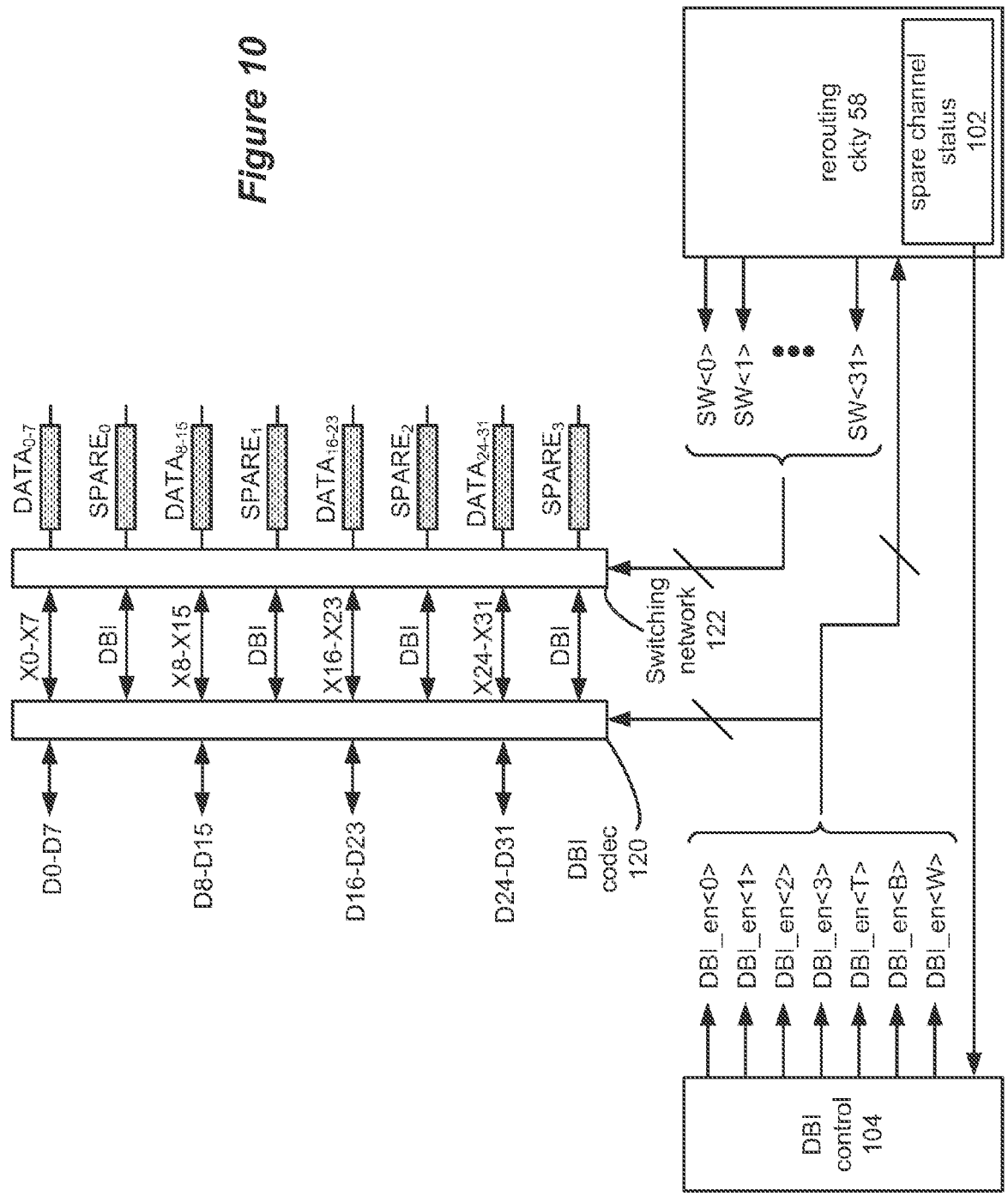
FIG. 10 shows circuitry for implementing any of the variations of FIGS. 9A-9E.

FIGS. 8-10 show the extension of the disclosed technique to a more realistic 32-bit data bus. As shown in FIG. 8, a typical TWI-based bus 15 in a memory module 40' comprises 32 data channels ($DATA_0$-$DATA_{31}$) and four spare channels ($SPARE_{0-3}$). When so configured, one spare channel is typically designated to serve as the rerouting channel for a given eight bits of the data channels, but this need not always be the case; spares may service more than a single byte. But in the simple case described below, $SPARE_0$ is designated as the rerouting path should any of data channels $DATA_{0-7}$ prove faulty; $SPARE_1$ is similarly designated for $DATA_{8-15}$; etc.

A larger bus with a plurality of spare channels increases the sophistication with which DBI algorithms can operate, assuming that at least one spare channel is not being used for rerouting. For example, and as shown in FIG. 8, a number of DBI enable signals can be employed to apply DBI to particular portions of the data signals. For example, DBI_en<0> can enable the DBI codec 120 to apply a DBI algorithm to the group of data signals presented to data channels $DATA_{0-7}$, i.e., the first byte of the 32-bit data bus 15; DBI_en<1> can apply the DBI algorithm to data signals presented to the group of data channels $DATA_{8-15}$; etc. In this way, the bus 15 can be apportioned to provide an independent DBI analysis to four different bytes of the bus. This renders four different DBI bits, DBI0-3: DBI0, corresponding to encoding data signals X0-X7 designated for $DATA_{0-7}$; DBI1, corresponding to encoded data signals X8-X15 designated for $DATA_{8-15}$, etc. These DBI bits, DBI0-3, can generally be sent on their respective spare channels $SPARE_{0-3}$, as explained in more detail below.

Apportioning the bus 15 in this manner for DBI purposes adds complexity, but can improve the benefits of DBI. This is because dividing the bus into groups of data signals, and applying DBI to each group independently and generating a DBI bit for each portion independently, reduces power consumption when compared to applying DBI to a larger, undivided bus (which undivided bus would only require one DBI bit). Applying DBI to an apportioned bus is addressed in the following references, which are submitted with the Information Disclosure Statement filed with this disclosure: U. Narayanan, "Enhanced Bus Invert Encodings for Low-Power," IEEE, Circuits and Systems, vol. 5, pgs 25-28 (2002); Y. Shin, "Reduction of bus transitions with partial bus-invert coding," Electronic Letters, vol. 34, no. 7 (Apr. 2, 1998); and M. Stan & W. Burleson, "Bus-Invert Coding for Low Power I/O," pgs. 1-20 (1999).

DBI can also operate to assess portions of the bus 15 larger than a byte. For example, the DBI codec 120 can be enabled to apply DBI to a group comprising a word's worth of data, i.e., 16 bits. This can occur by providing two different DBI enable signals to the DBI codec 120: DBI_en<T>, which enables the DBI codec 120 to apply its algorithm to the top word of data, i.e., to the data signals presented to data channels $DATA_{0-15}$; and DBI_en<B>, which similarly enables the DBI codec 120 to apply DBI to the bottom word of data to be presented to $DATA_{16-31}$. Apportioning the bus in this manner requires two DBI bits, DBI_T and DEI_B, to be carried on the spare channels.

Finally, DBI can also operate on the entire double word of data, i.e., a single group of all 32 data signals. The DBI codec 120 can be enabled to do so via signal DBI_en<W>, which assesses DBI based on the whole of the data channels. If DBI is applied to the entire bus, only one DBI bit, DBI_W, would be required, which could be carried on any free spare channel.

The ability to apply DBI at these various levels of bus apportionment improves the flexibility with which DBI can be applied to the data bus 15. However, since the DBI bit or bits are sent over the spare channels, the options for applying DBI will be constrained depending on which spare channels are needed for rerouting. The DBI control circuitry 104 therefore, after consideration of the status of the switch control signals to understand where rerouting is occurring along the bus 15, should issue appropriate DBI enable signals to apportion the bus for DBI purposes without inhibiting rerouting. Various conditions illustrating such options are shown in FIGS. 9A-9E.

FIG. 9A illustrates a first condition in which none of the data channels $DATA_{0-31}$ has experienced a continuity error. In this circumstance, all of the data channels $DATA_{0-31}$ carry their designated encoded data signals X1-X31, and all of the spare channels $SPARE_{0-3}$ are available to carry a DBI bit, and this can occur in different ways depending on the designer's choice for apportioning the bus. In the option of column A, the bus is apportioned into four bytes, with DBI being applied to each byte. This requires the DBI control circuitry 104 to generate four codec enable signals, DBI_en<0:3>. Enabling the codec in this manner causes the codec 120 to generate four DBI bits: DBI0 associated with encoded data signals X0-X7, DBI1 associated with X8-X15; DBI2 associated with X16-X23; and DBI3 associated with X24-X31.

In the option of column B, DBI can be apportioned to the top and bottom words of data, This requires the use of enable signals DBI_en<T> and DBI_en<B>, and the generation of two DBI bits: DBI_T associated with the top word of encoded data signals X0-X15 and DBI_B associated with X16-31. Here, DBI_T can be sent on spare channel $SPARE_1$ (or $SPARE_0$) and DBI_B can be sent on spare channel $SPARE_3$ (or $SPARE_2$), with the other spare channels remaining unused.

In the option of column C, the bus is not apportioned, and DBI is applied to all 32 data signals, requiring the use of enable signal DBI_en<AV> and the generation of only a single DBI bit, DBI_W, which can be sent on any of the spare channels, but which is shown in FIG. 9A as sent on $SPARE_3$. Because none of the data channels are faulty, the other spare channels go unused.

FIG. 9B illustrates a second condition in which only one of the data channels has experienced a continuity error and requires rerouting. This error is illustrated as occurring in the first byte of data, i.e., in one of data channels $DATA_{0-7}$. In this circumstance, the spare channel associated with the affect byte, $SPARE_0$, will need to carry the affected data signal. In option A, DBI is simply not performed on the faulty byte, i,e,, DBI_en<0> is not issued by the DBI control circuitry 104, and DBI0 is not generated by the DBI codec 120. Instead, the original data signals D0-D7 pass to their respective data channels $DATA_{0-7}$, expect for the data signal designated for the faulty channel, which is sent to the spare channel $SPARE_0$. In short, the DBI codec 120 is bypassed for the first byte of data. Because the remaining spare channels are unused, they can be used for DBI on a byte basis. Thus, enable signals DBI_en<1:3> are issued, which causes codec 120 to encode the original data signals D8-D31 into encoded signals X8-X31, and which generates DBI bits DBI1, DB2, and DBI3 for each byte, These DBI bits are carried by the free spare channels $SPARE_{1-3}$, respectively.

All other options B, C, and D of FIG. 9B perform DBI on the entirety of the 32 data signals, but with different apportionments. In option B, DBI is performed on the top word, i.e., the one containing the faulty data channel. More specifically, DBI control circuitry 104, realizing from the switch control signal that $SPARE_0$ must carry the affected encoded data signal, issues DBI_en<T> to perform DBI on the original data signals D0-D15 to produce encoded data signals X0-X15. The resulting DBI bit, DBI_T, is sent to the other spare channel in the word, $SPARE_1$. In option B, the bottom two bytes are apportioned on a byte basis, and handled the same as option A, with byte-specific DBI bits, DBI2 and DBI3, being carried by the otherwise unused spare channels, SPARE$_2$ and SPARE$_3$.

In option C, DBI is performed on a word basis. This requires issuing enable signals DBI_en<T> and DBI_en<B>, which enables the codec 120 to produced encoded data signals X0-X15 and X16-X31, and their associated DBI bits, DBI T and DBI_B, respectively. As with option B, the faulty encoded data signal continues to be carried by SPARE$_0$, with the other spare in the word, SPARE$_1$, carrying DBI_T. On the bottom word, the DBI bit, DBI_B, is sent to one of the bottom word spare channels (e.g, SPARE$_3$) and the other spare channel (SPARE$_2$) is unused. Option C thus differs from option B in that the DBI apportionment is applied to equally-sized portions of the data bus, i.e., two words, instead of one word and two bytes.

In option D, DBI is applied to all 32 bits, similar to what occurred in option C of FIG. 9A, with the only difference being that the affected encoded data signal is rerouted to SPARE$_0$. As shown in FIG. 9B, the remaining two spare channels SPARE$_1$ and SPARE$_2$, i.e., those carrying neither DBI_W nor the affected encoded data signal, remain unused.

FIG. 9C illustrates a third condition in which two of the data channels have experienced continuity errors and require rerouting. This third condition can comprise two different scenarios in which the faulty data channels occur in different words (III) or in the same word (III'). Turning to scenario HI first, option A is essentially similar to option A in FIG. 9B, in that DBI is applied on a byte basis but simply not performed on the two faulty bytes. In option B, DBI is performed on all data signals, but on a word basis. Therefore, one spare channel in each word carries the rerouted encoded data signal with the other spare channel carrying the DBI bit (DBI_T or DBI_B) for the word. Option C performs DBI on all 32 bits, One spare channel carries the DBI bit for the double word (DBI_W), two other spare channels carry the rerouted encoded data signals, and the remaining spare channel goes unused.

Scenario III', in which both errors occur in the same word, is essentially the same as Scenario III just discussed. However, in option B, where DBI assessment occurs on a word basis, there is no spare channel in the top byte to carry the DBI bit for the top byte (i.e., DBI_T'). Therefore, in this scenario, DBI_T bit is routed to the available spare channel in the bottom word (i.e., SPARE$_2$). Although this generally violates the preference to keep a particular DBI bit in proximity to its associated data, it requires no particular technical challenge to so reroute the DBI bit.

FIG. 9D illustrates a fourth condition in which three of the data channels have experienced continuity errors requiring rerouting. Option A is similar to option A as discussed in FIGS. 9B and 9C, in that DBI is merely not applied to the bytes having the affected data, leaving only one byte (that byte not requiring rerouting) to benefit from DBI. Option B varies from option A in that DBI is applied to a word of data, instead of a mere byte. Here, DBI is ignored in the top word (the byte having two errors), and the spare channels associated with that word merely carry the rerouted original data signals. DBI is however applied to the bottom word, with the spare in the faulty byte carrying the affected encoded data signal, and the remaining spare carrying the DBI bit for the bottom word (DBI_B). In option C, DBI is assessed for all 32 bits. The single DBI bit from this analysis, DBI_W, is issued in the only byte not experiencing an error, and thus whose spare channel is not already carrying rerouted encoded data.

FIG. 9E illustrates a fifth condition in which all bytes of data are experiencing a continuity error. In this case, all of the spare channels must be used to reroute the data signal from its associated byte. Accordingly, there is no room left to carry any DBI bits. The DBI control circuitry 104 thus issues no DBI enable signals, and the DBI codec 120 is bypassed.

Circuitry for implementing the various conditions illustrated in FIG. 9A-9E is shown generically in FIG. 10. As was discussed earlier, the DBI control circuitry 104 receives an indication of the status of the various spare channels from storage 102, and generates DBI enable signals as appropriate. DBI control circuitry 104 would normally comprise a network of logic gates configured to affect DBI in accordance with the various conditions set forth in FIGS. 9A-9E, and in accordance with the particular option within each condition that the designer finds suitable for a given environment. Given the wide array of potential DBI encoding options just discussed, one skilled in the art will realize that the logic network of DBI control circuitry 104 will be implementation specific, and a routine matter to construct once the designer's options have been finalized.

The switching network 122 will likewise be implementation specific and will depend on the DBI options chosen. When applied to a more complex bus such as that shown in FIG. 10, one skilled in the art will realize that the multiplexers in the switching network 122 may require more complex logic function at their inputs, or may require multiple inputs or multiple levels of multiplexing. Designing such logic would be routine given the details provided in this disclosure once the particular options for DBI encoding have been finalized.

Although conceived of in the context of a vertically stacked memory module, it should be noted that the inventive concepts disclosed herein are not necessarily limited to that environment.

Any of these DBI algorithms mentioned above, or other data encoding algorithms more generally, can be used in the context of the disclosed embodiments of the invention. Additionally, other embodiments of the invention would not necessarily require operation of a data bus inversion algorithm. Instead, the codecs 120 could comprise other types of encoders and decoders (e.g., error detection, or error correction), and the DBI bit could more generally comprise an encoding indicator bit or hits (e.g., an error detection bit, or an error correction bit) consistent with the particular decoder. Thus, previously-existing or future-developed encoding decoding schemes will also benefits from the disclosed techniques.

While some implementations have been disclosed, it should be understood that the disclosed circuitry can be achieved in many different ways to the same useful ends as described herein. In short, it should be understood that the inventive concepts disclosed herein are capable of many modifications. To the extent such modifications fall within the scope of the appended claims and their equivalents, they are intended to be covered by this patent.

What is claimed is:

1. A method, comprising:
operating a stacked memory device through use of a logic IC comprising through wafer interconnect (TWI) rerouting circuitry, and DBI encoding circuitry:
wherein the stacked memory device comprises multiple stacked memory devices interconnected with one another by TWIs of groups of multiple individual channels;

wherein groups of individual channels form respective bytes of a memory bus, and wherein logically adjacent pairs of bytes form respective words of data channels;

wherein each byte of individual data channels includes an associated configurable channel, configurable as a data bus inversion (DBI) channel or a replacement data channel; and wherein words of data channels include at least one associated spare data channel;

assigning the two configurable channels of a first word of data to serve as data bus inversion (DBI) channels for the respective bytes of the first word; and in response to identification that an individual data channel of a first byte of the first word is defective, rerouting the data channels of the first byte to include the configurable channel of the first byte.

2. The method of claim 1, wherein the logic IC further comprises test circuitry, and wherein the identification that an individual data channel of the first byte of the first word is defective is determined by the test circuitry.

3. The method of claim 2, further comprising in response to identification that an individual data channel of the first byte of the first word is defective, rerouting data channels of the first byte to include the spare data channel.

4. A method, comprising:

operating a stacked memory device through use of a logic IC comprising test mode circuitry, through wafer interconnect (TWI) rerouting circuitry, and DBI encoding circuitry, wherein the stacked memory device comprises multiple stacked memory devices interconnected with one another by TWIs of groups of multiple individual channels, wherein groups of individual channels respective bytes of a memory bus, and wherein logically adjacent pairs of bytes form respective words of data channels; wherein each byte of individual data channels includes an additional configurable channel; and wherein words of data channels include at least one further rerouting data channel; assigning the two additional configurable data channels of a first word of data to serve as data bus inversion (DBI) channels for the respective bytes of the first word; and in response to identification that an individual data channel of a first byte of the first word is defective, rerouting the data channels of the first byte to include the assigned DBI channel of the first byte, wherein rerouting the data channels of the first byte to include the assigned DBI channel of the first byte includes remapping the defective data channel to the configurable channel of the first byte.

5. The method of claim 4, wherein rerouting the data channels of the first byte to include the assigned DBI channel of the first byte eliminates DBI functionality in the first byte.

6. The method of claim 4, further comprising in response to identification that an individual data channel of a second byte of the first word is defective, remapping the defective data channel of the second byte to the configurable channel of the second byte.

7. The method of claim 4, wherein the TWI rerouting circuitry comprises a switching network.

8. The method of claim 4, further comprising operating the DBI encoding circuitry to apply a DBI indicator signal on the configurable channel of the second byte to identify the inversion state of the data channels of both the first and second bytes of the word.

9. The method of claim 4, wherein the memory bus comprises at least 32 data channels.

10. The method of claim 4, wherein the DBI encoding circuitry functions to produce encoded data signals from original data signals in accordance with the associated DBI signal.

11. A stacked memory device, comprising:

a logic IC comprising test mode circuitry, through wafer interconnect (TWI) rerouting circuitry, and DBI encoding circuitry;

multiple stacked memory devices stacked with the logic circuit, the logic circuit and the multiple stacked memory devices interconnected with one another by through wafer interconnects (TWIs) of multiple individual channels, wherein groups of individual channels form respective bytes of a memory bus, and wherein pairs of bytes form data channels of respective words, and wherein first and second bytes of data channels of a first word are adjacent bytes along the bus;

wherein each byte of individual data channels includes an additional configurable channel;

wherein a word of data channels includes at least one further spare data channel; and wherein in a first operational mode, the additional configurable channels of the first and second bytes are respectively configured as a data bus inversion (DBI) channel for the respective byte; and wherein in response to a determination by the test circuitry that an individual data channel of the first byte of data channels is defective, the channel remapping circuitry is operative to remap the additional configurable channel of the first byte from being a DBI channel for the first byte of data channels to a replacement data channel of the first byte.

12. The stacked memory device of claim 11, wherein the TWI routing circuitry includes a switching network, and wherein the TWI routing circuitry is further operable to remap a DBI indicator channel for a second byte in first word containing the first byte, to serve as a DBI indicator channel for both the first and second bytes of data channels.

13. The stacked memory device of claim 11, wherein the memory bus comprises at least 32 data channels.

14. A method, comprising:

operating a stacked memory device through use of a logic IC comprising test mode circuitry, through wafer interconnect (TWI) rerouting circuitry, and DBI encoding circuitry wherein the logic IC is stacked with the multiple memory devices and is coupled to the stacked memory devices through the TWIs;

wherein the stacked memory device comprises multiple stacked memory devices interconnected with one another by TWIs of groups of multiple individual channels;

wherein groups of individual channels respective bytes of a memory bus, and wherein logically adjacent pairs of bytes form respective words of data channels;

wherein each byte of individual data channels includes an additional configurable channel; and wherein words of data channels include at least one further redundant data channel;

assigning the two configurable channels of a first word to serve as data bus inversion (DBI) channels for the respective bytes of the first word; and in response to identification that an individual data channel of a first byte of a first word is defective, remapping the defective data channels to assign a data channel to the configurable channel of the first byte.

15. The method of claim 14, further comprising configuring a DBI channel of a word to control database inversion encoding of both bytes of the word.

16. The method of claim 14, further comprising configuring a DBI channel of a word to control database inversion encoding of multiple words.

\* \* \* \* \*